(12) United States Patent
Barroso et al.

(10) Patent No.: US 7,142,878 B1
(45) Date of Patent: Nov. 28, 2006

(54) METHOD OF TIMING CALIBRATION (75) Inventors: Christopher Burke Barroso, New York, NY (US); Byron Hua Chen, Whippany, NJ (US); Giovanni Vannucci, Township of Middletown, Monmouth County, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/439,217

(22) Filed: Nov. 12, 1999

(51) Int. Cl.
*H04Q 7/20* (2006.01)
(52) U.S. Cl. .............. 455/456.6; 455/456.6; 455/456.2; 455/12.1; 455/13.2; 455/423; 455/427; 342/357.03
(58) Field of Classification Search .......... 370/316, 370/324, 350; 455/13.2, 12.1, 343; 340/825.69; 342/357.06, 357.05
See application file for complete search history.

(56) References Cited

U.S. PATENT DOCUMENTS

| | | | | |
|---|---|---|---|---|
| 4,607,257 A | * | 8/1986 | Noguchi ............... 340/825.69 |
| 5,245,634 A | * | 9/1993 | Averbuch ................ 375/108 |
| 5,416,808 A | * | 5/1995 | Wisaman et al. .......... 375/350 |
| 5,426,642 A | * | 6/1995 | Tanabe ................... 370/324 |
| 5,510,797 A | * | 4/1996 | Abraham et al. .......... 342/352 |
| 5,697,082 A | * | 12/1997 | Greer et al. .............. 455/255 |
| 5,790,939 A | * | 8/1998 | Malcolm et al. .......... 455/13.2 |
| 5,899,957 A | * | 5/1999 | Loomis .................. 701/214 |
| 5,995,820 A | * | 11/1999 | Young et al. ............. 455/343 |
| 6,070,078 A | * | 5/2000 | Camp et al. ............ 455/456.2 |
| 6,118,977 A | * | 9/2000 | Vannucci ................ 455/12.1 |
| 6,166,685 A | * | 12/2000 | Soliman ................. 342/357.1 |
| 6,181,932 B1 | * | 1/2001 | Kolev et al. ............... 455/428 |
| 6,201,802 B1 | * | 3/2001 | Dean .................... 370/350 |
| 6,215,442 B1 | * | 4/2001 | Sheynblat et al. ..... 342/357.06 |
| 6,266,008 B1 | * | 7/2001 | Huston et al. ......... 342/357.09 |
| 6,415,154 B1 | * | 7/2002 | Wang et al. ............ 455/456.1 |

FOREIGN PATENT DOCUMENTS

| | | |
|---|---|---|
| GB | 2 308 033 | 6/1997 |
| WO | WO 99/19743 | 4/1999 |
| WO | WO 99/54753 | 10/1999 |

OTHER PUBLICATIONS

European Search Report, no date listed.

* cited by examiner

*Primary Examiner*—Temica Beamer
*Assistant Examiner*—Joy Contee (57) ABSTRACT

Disclosed is a method for deriving accurate global positioning satellite (GPS) timing by calibrating frame boundaries to GPS timing. Time calibration is achieved by determining a time difference $\Delta t$ between a reference GPS time (or pulse) and an nth frame boundary. The time difference $\Delta t$ and a frame boundary identifier specifying the nth frame boundary are provided to a device equipped with a full or partial GPS receiver so that the GPS equipped device may synchronize itself to GPS timing. Upon synchronizing itself to GPS timing, the GPS equipped device may search for GPS signals using information provided by a geographical location server, e.g., WAG server.

8 Claims, 8 Drawing Sheets

PRIOR ART

METHOD OF TIMING CALIBRATION

FIELD OF THE INVENTION

The present invention relates generally to wireless communications systems and, in particular, to geographical location using wireless communications systems.

BACKGROUND OF THE RELATED ART

Satellite-based navigational systems provide accurate, three dimensional position information to worldwide users. Prior art satellite-based navigational systems, however, utilize a time consuming search process for determining position information. Time consuming search processes are undesirable in navigational systems particularly when the user is moving or in an emergency situation requiring immediate assistance.

Figure 1:
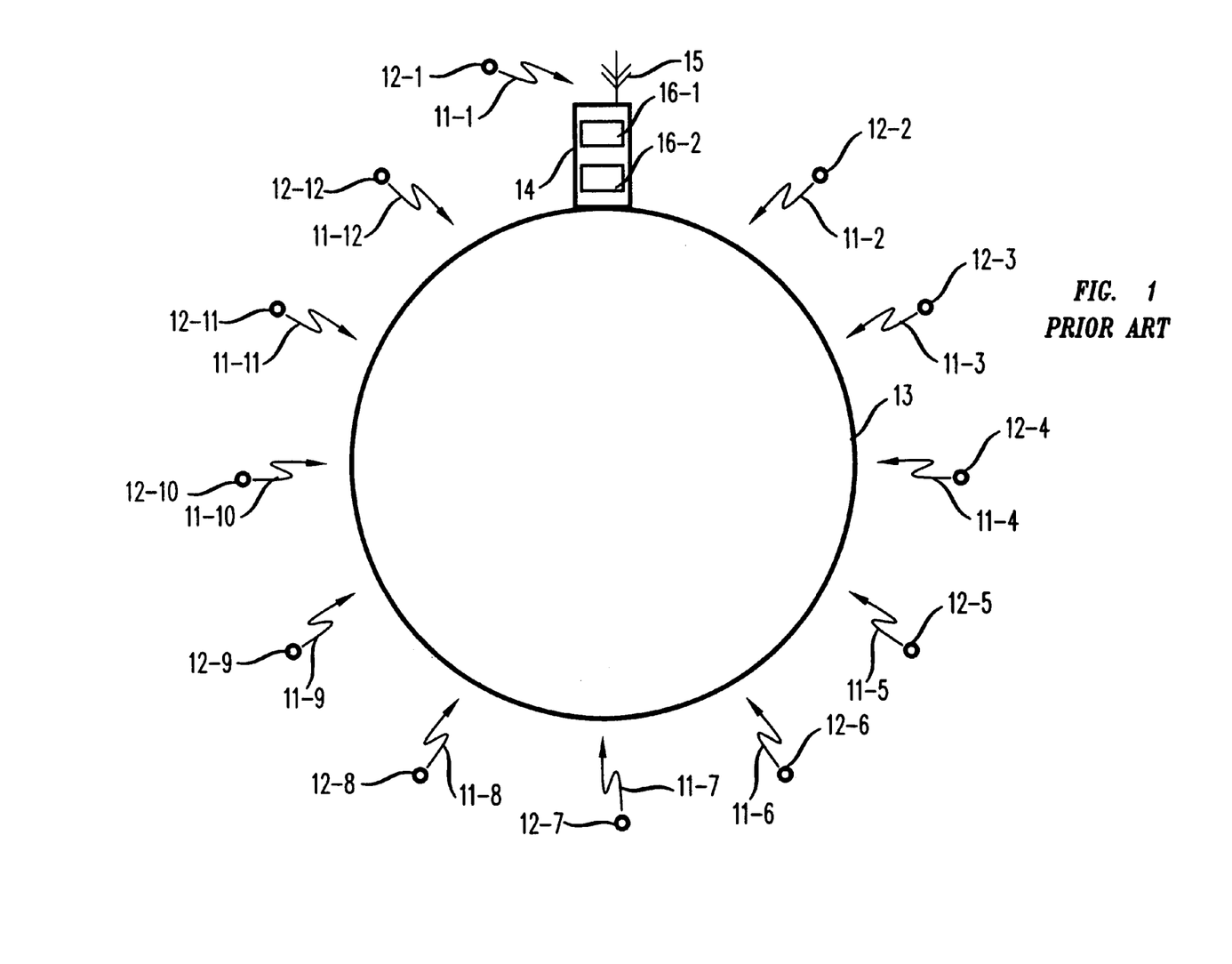
FIG. 1 depicts a well-known satellite-based navigational system referred to as Global Positioning System (GPS)
Figures 2, 3:
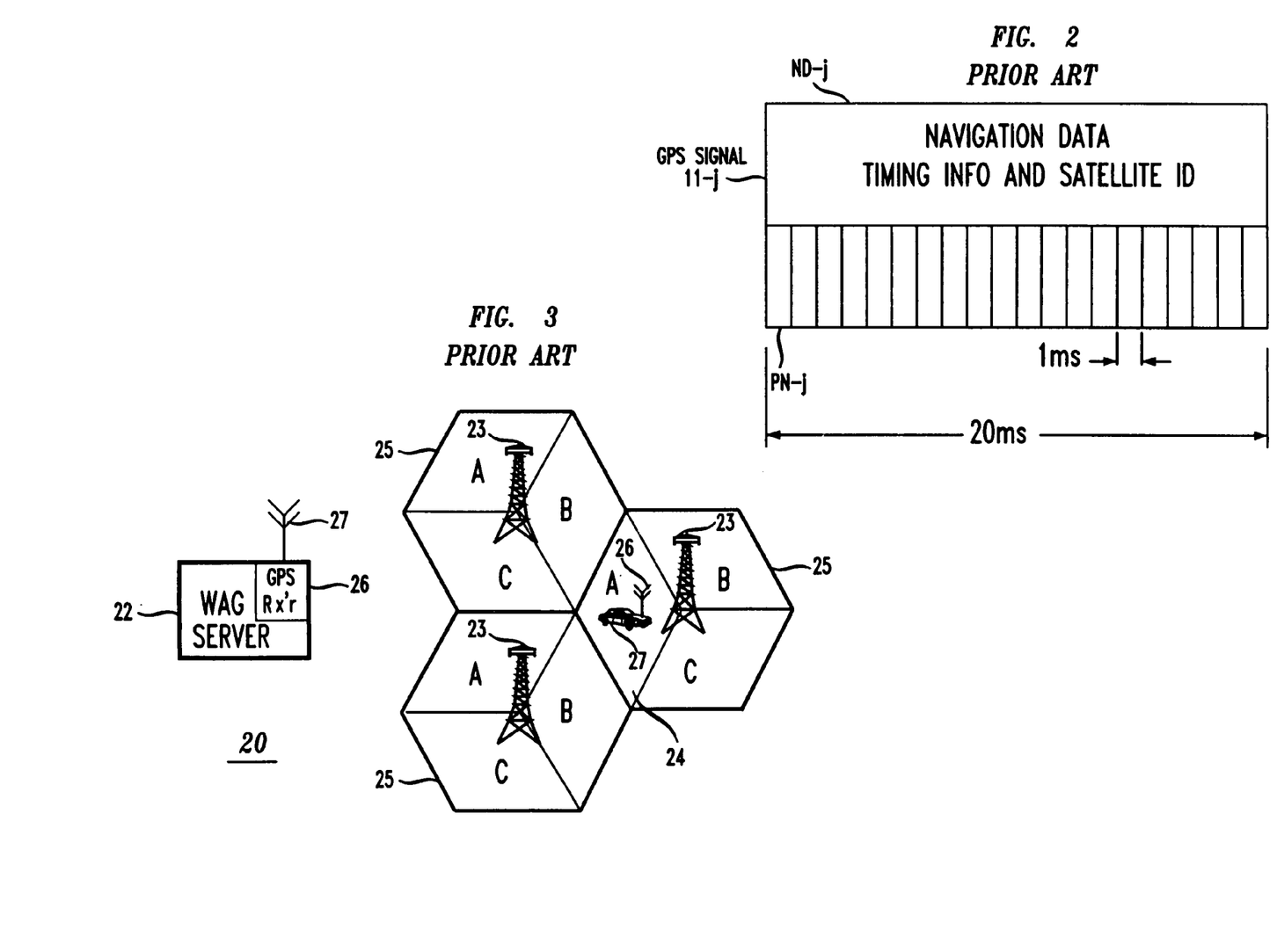
FIG. 2 depicts a typical 20 ms frame of a GPS signal.
FIG. 3 depicts a Wireless Assisted GPS (WAG) system.

FIG. 1 depicts a well-known satellite-based navigational system referred to as Global Positioning System (GPS) 10. GPS 10 comprises a plurality of satellites 12-$j$ and at least one GPS receiver 14, where $j=1,2,\ldots,n$. Each satellite 12-$j$ orbiting earth at a known speed $v_j$ and being a known distance apart from the other satellites 12-$j$. Each satellite 12-$j$ transmits a GPS signal 11-$j$ which includes a carrier signal with a known frequency f modulated using a unique pseudo-random noise (PN-j) code and navigational data (ND-j) associated with the particular satellite 12-$j$, wherein the PN-j code includes a unique sequence of PN chips and navigation data ND-j includes a satellite identifier, ephemeris information and orbital data, such as elevation angle $\alpha_j$ and azimuth angle $\phi_j$. FIG. 2 depicts a typical 20 ms frame of the GPS signal 11-$j$ which comprises twenty full sequences of a PN-j code in addition to a sequence of navigation data ND-j.

GPS receiver 14 comprises an antenna 15 for receiving GPS signals 11-$j$, a plurality of correlators 16-$k$ for detecting GPS signals 11-$j$ and a processor 17 having software for determining a position using the navigation data ND-j, where $k=1,2,\ldots,m$. GPS receiver 14 detects GPS signals 11-$j$ via PN-j codes. Detecting GPS signals 12-$j$ involves a correlation process wherein correlators 16-$k$ are used to search for PN-j codes in a carrier frequency dimension and a code phase dimension. Such correlation process is implemented as a real-time multiplication of a phase shifted replicated PN-j codes modulated onto a replicated carrier signal with the received GPS signals 11$j$, followed by an integration and dump process.

In the carrier frequency dimension, GPS receiver 14 replicates carrier signals to match the frequencies of the GPS signals 11-$j$ as they arrive at GPS receiver 14. However, due to the Doppler effect, the frequency f at which GPS signals 11-$j$ are transmitted changes an unknown amount $\Delta f_j$ before GPS signal 11-$j$ arrives at GPS receiver 14—that is, each GPS signal 11-$j$ should have a frequency $f+\Delta f_j$ when it arrives at GPS receiver 14. To account for the Doppler effect, GPS receiver 14 replicates the carrier signals across a frequency spectrum $f_{spec}$ ranging from $f+\Delta f_{min}$ to $f+\Delta f_{max}$ until the frequency of the replicated carrier signal matches the frequency of the received GPS signal 11-$j$, wherein $\Delta f_{min}$ and $\Delta f_{max}$ are a minimum and maximum change in frequency GPS signals 11-$j$ will undergo due to the Doppler effect as they travel from satellites 12-$j$ to GPS receiver 14, i.e., $\Delta f_{min} \leq \Delta f_j \leq \Delta f_{max}$.

In the code phase dimension, GPS receiver 14 replicates the unique PN-j codes associated with each satellite 12-$j$. The phases of the replicated PN-j codes are shifted across code phase spectrums $R_j(spec)$ until replicated carrier signals modulated with the replicated PN-j codes correlate, if at all, with GPS signals 11-$j$ being received by GPS receiver 14, wherein each code phase spectrum $R_j(spec)$ includes every possible phase shift for the associated PN-j code. When GPS signals 11-$j$ are detected by correlators 16-$k$, GPS receiver 14 extracts the navigation data ND-j from the detected GPS signals 11-$j$ and uses the navigation data ND-j to determine a location for GPS receiver 14, as is well-known in the art.

Correlators 16-$k$ are configured to perform parallel searches for a plurality of PN-j codes across the frequency spectrum $f_{spec}$ and the code phase spectrums $R_j(spec)$. In other words, each of the plurality of correlators 16-$k$ are dedicated to searching for a particular PN-j code across each possible frequency between $f+\Delta f_{min}$ to $f+\Delta f_{max}$ and each possible for that PN-j code. When a correlator 16-$k$ completes its search for a PN-j code, the correlator 16-$k$ searches for another PN-j code across each possible frequency between $f+\Delta f_{min}$ to $f+\Delta f_{max}$ and each possible phase shift for that PN-j code. This process continues until all PN-j codes are collectively searched for by the plurality of correlators 16-$k$. For example, suppose there are twelve satellites 12-$j$, thus there would be twelve unique PN-j codes. If GPS receiver 14 has six correlators 16-$k$, then GPS receiver 14 would use its correlators 16-$k$ to search for two sets of six different PN-j codes at a time. Specifically, correlators 16-$k$ search for the first six PN-j codes, i.e., correlator 16-1 searches for PN-1, correlator 16-2 searches for PN-2, etc. Upon completing the search for the first six PN-j codes, correlators 16-$k$ search for the next six PN-j codes, i.e., correlator 16-1 searches for PN-7, correlator 16-2 searches for PN-8, etc.

For each PN-j code being searched, correlator 16-$k$ performs an integration and dump process for each combination of frequency and phase shifts for that PN-j code. For example, suppose the frequency spectrum $f_{spec}$ includes 50 possible frequencies for the carrier signal and the code phase spectrum $R_j(spec)$ for a PN-j code includes 2,046 possible half-chip phase shifts. To search for every possible combination of frequency and half-chip phase shifts for the PN-j code, the correlator 16-$k$ would then need to perform 102,300 integrations. A typical integration time for correlators 16-$k$ is 1 ms, which is generally sufficient for GPS receiver 14 to detect GPS signals 11-$j$ when antenna 15 has a clear view of the sky or a direct line-of-sight to satellites 12-$j$. Thus, for the above example, 102.3 seconds would be required for one correlator 16-$k$ to search every possible combination of frequency and half-chip phase shifts for a PN-j code.

GPS receivers, however, are now being incorporated into mobile-telephones or other types of mobile communication devices which do not always have a clear view of the sky. Thus, GPS receiver 14 will not always have a clear view of the sky. In this situation, the signal-to-noise ratios of GPS signals 11-$j$ received by GPS receiver 14 are typically much lower than when GPS receiver 14 does have a clear view of the sky, thus making it more difficult for GPS receiver 14 to detect the GPS signals 11$j$. To compensate for weaker signal-to-noise ratios and enhance detection of GPS signals 11-$j$, correlators 16-$k$ can be configured with longer integration times. A sufficient integration time, in this case, would be approximately 1 second. Thus, for the example above, 102,300 seconds would be required for a correlator 16-$k$ to search for every possible combination of frequency and half-chip phase shifts for a PN-j code. Longer integration times result in longer acquisition times for detecting GPS signals 11-j. Longer acquisition times are undesirable.

Wireless assisted GPS (WAG) systems were developed to facilitate detection of GPS signals 11-j by GPS receivers configured with short or long integration times. The WAG system facilitates detection of GPS signals 11-j by reducing the number of integrations to be performed by correlators searching for GPS signals 11-j. The number of integrations is reduced by narrowing the frequency range and code phase ranges to be searched. Specifically, the WAG system limits the search for GPS signals 11-j to a specific frequency or frequencies and to a range of code phases less than the code phase spectrum $R_j(spec)$ during time intervals referred to herein as search windows.

FIG. 3 depicts a WAG system 20 comprising a WAG server 22, a plurality of base stations 23 and at least one WAG client 24. WAG server 22 includes a GPS receiver 26 having an antenna 27 installed in a known stationary location with a clear view of the sky. GPS receiver 26 would typically have correlators configured with short integration times because antenna 27 has a clear view of the sky. WAG server 22 being operable to communicate with base stations 23 either via a wired or wireless interface. Each base station 23 has a known location and provides communication services to WAG clients located within a geographical area or cell 25 associated with the base station 23, wherein each cell 25 is a known size and is divided into a plurality of sectors. WAG client 24 includes a GPS receiver 28 and perhaps a mobile-telephone 27, and is typically in motion and/or in an unknown location with or without a clear view of the sky. GPS receiver 28 having correlators typically configured with long integration times. Note that the term "mobile-telephone," for purposes of this application, shall be construed to include, but is not limited to, any communication device.

Figure 4:
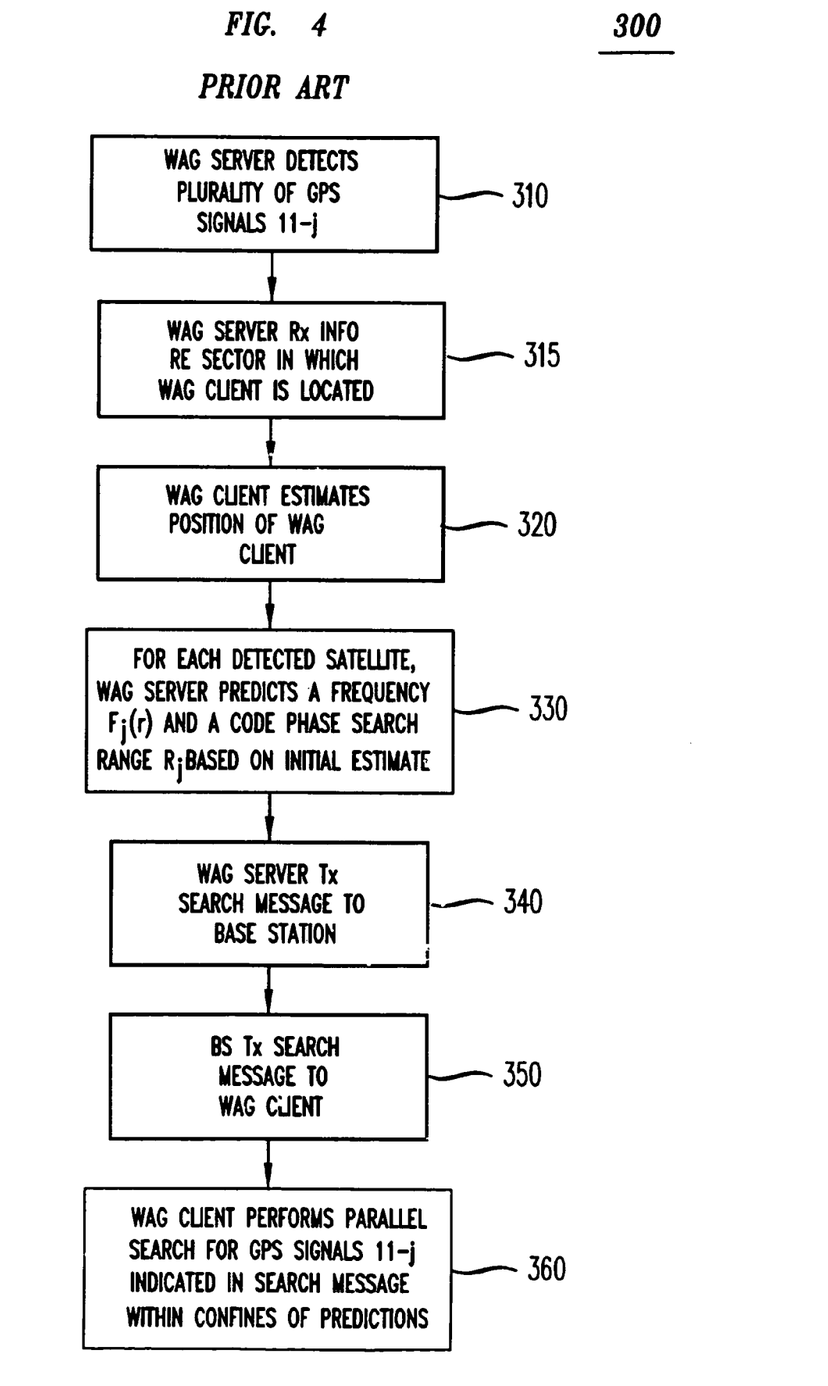
FIG. 4 depicts a flowchart illustrating the operation of the WAG system of FIG. 3.
Figure 5:
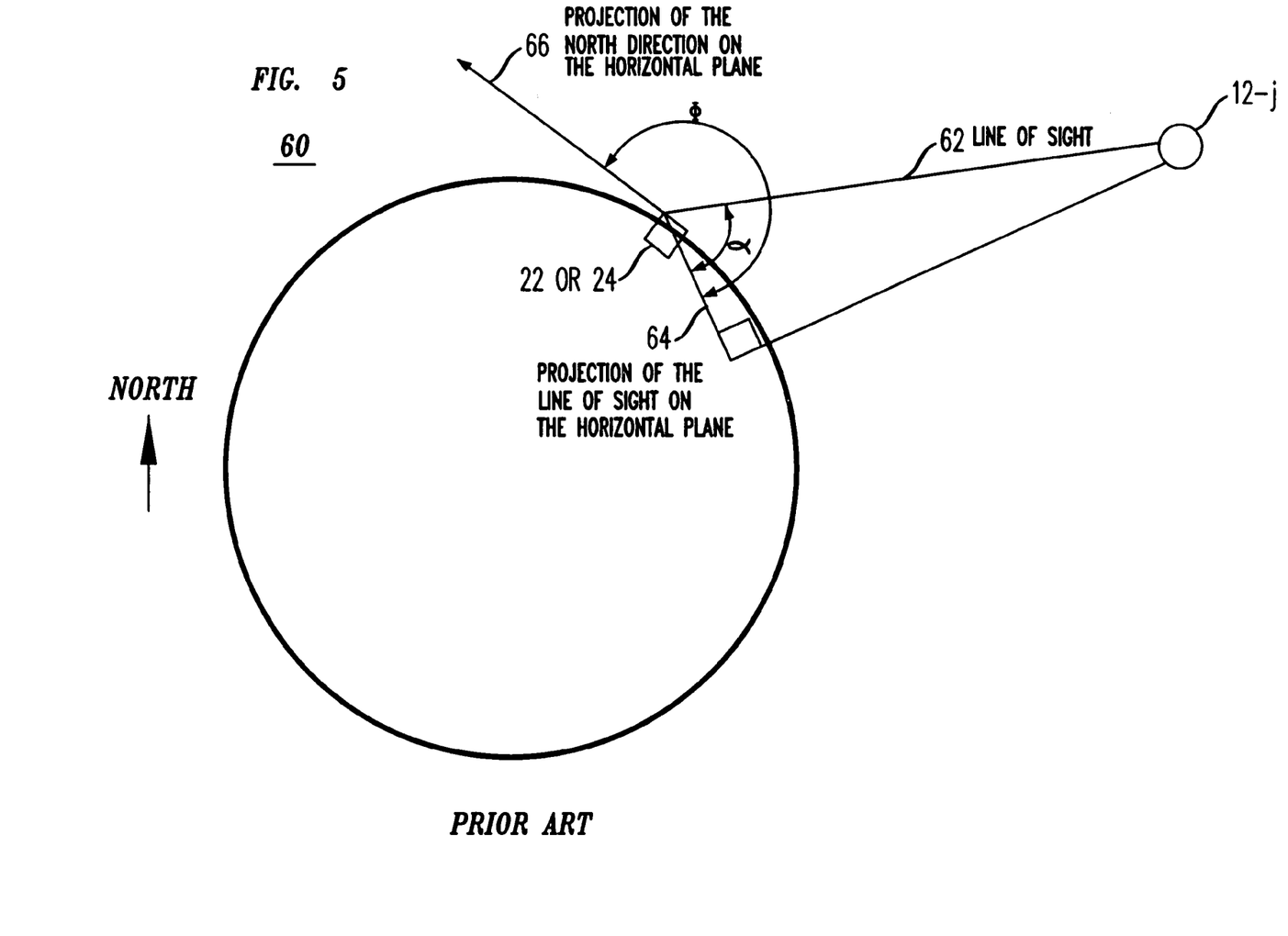
FIG. 5 depicts an elevation angle $\alpha_j$ and an azimuth angle $\phi_j$ corresponding to a satellite and a WAG server or WAG client.

FIG. 4 is a flowchart 300 illustrating the operation of WAG system 20. In step 310, WAG server 22 detects a plurality of satellites 12-j via their GPS signals 11-j using its GPS receiver 26. WAG server 22 acquires the following information from each detected satellite 12-j: the identity of satellite 12-j and frequency $f_j$, code phase, elevation angle $\alpha_j$ and azimuth angle $\phi_j$ associated with the detected satellite 12-j, wherein the elevation angle $\alpha_j$ is defined as the angle between the line of sight from WAG server 22 or client 24 to a satellite 12-j and a projection of the line of sight on the horizontal plane, and the azimuth angle $\phi_j$ is defined as the angle between the projection of the line of sight on the horizontal plane and a projection of the north direction on the horizontal plane. See FIG. 5, which depicts an elevation angle $\alpha_j$ and an azimuth angle $\phi_j$ corresponding to a satellite 12-j and a WAG server 22 or WAG client 24.

In step 315, WAG server 22 receives sector information from base station 23 currently in communication with or serving WAG client 24, wherein the sector information indicates a sector WAG client 24 is currently located. In step 320, WAG server 22 makes an initial estimate of WAG client's position based on the known location of the serving base station, the cell size associated with the serving base station, the sector in which WAG client 24 is currently located, and the one way delay between the WAG client 24 and the serving base station. In one embodiment, WAG server 22 initially estimates that WAG client 24 is located at a reference point within the sector, e.g., point at approximate center of sector. In another embodiment, WAG server 22 initially estimates WAG client 24's position using well-known enhanced forward link triangulation (EFLT) techniques.

In step 330, for each detected satellite 12-j, WAG server 22 uses the information acquired from the detected GPS signals 11-j to predict, for a reference time $t_j$, a frequency $f_j(r)$ at the reference point, a code phase search range $R_j(sect)$ which includes all possible code phases for GPS signal 11-j arriving anywhere within the sector or an estimated area smaller than the sector where WAG client 24 is currently located, wherein reference time $t_j$ is a GPS time. In step 340, WAG server 22 transmits a search message to the serving base station 23, wherein the search message includes, for each detected satellite 12-j, information regarding the associated PN-j code, predicted frequency $f_j(r)$, code phase search range $R_j(sect)$ and reference time $t_j$.

In step 350, serving base station 23 transmits the search message to WAG client 24 which, in step 360, begins a parallel search within search windows indicated by reference times $t_j$ for the satellites 12-j indicated in the search message. Specifically, WAG client 24 will use its correlators to simultaneously search for each of the GPS signals 11-j at the predicted frequency $f_j(r)$ within the limitations of the code phase search range $R_j(sect)$ and search windows indicated by reference times $t_j$. Thus, the number of integrations is reduced to the predicted frequency $f_j(r)$ within the limitations of the code phase search range $R_j(sect)$.

In order for WAG client 24 to properly perform the search, WAG client 24 needs to be synchronized to GPS time such that WAG client 24 searches for GPS signals 11-j at the appropriate times as indicated by reference time $t_j$ which, as mentioned earlier, is a GPS time. WAG client 24 is typically synchronized to a system time, which is corresponds to timing used to synchronize base station 23 to other base stations 23 belonging to a same wireless communications system. If the system time is synchronized with GPS time, WAG client 24 will understand GPS time and search for GPS signals 11-j at the appropriate times as indicated by reference times $t_j$. Wireless communications systems based on the well-known IS-95 or IS-2000 standard utilize a system time that is synchronized with GPS time. However, wireless communications systems based on other standards, such as W-CDMA, TDMA or GSM, do not utilize a system time that is synchronized with GPS time. In such wireless communications system, WAG client 24 would need to receive reference times $t_j$ expressed in terms of system time, or would need to be able to synchronize itself to GPS time. Accordingly, there exists a need to derive accurate GPS timing so that WAG technology can be applied to wireless communications systems not synchronized with GPS timing.

SUMMARY OF THE INVENTION

The present invention is a method for deriving accurate global positioning satellite (GPS) timing by calibrating frame boundaries to GPS timing. Time calibration is achieved by determining a calibration time Δt between a reference GPS time (or pulse) and an nth frame boundary. The calibration time Δt and a frame boundary identifier specifying the nth frame boundary are provided to a device equipped with a full or partial GPS receiver so that the GPS equipped device may synchronize itself to GPS timing. Upon synchronizing itself to GPS timing, the GPS equipped device may search for GPS signals using information provided by a geographical location server, e.g., WAG server.

BRIEF DESCRIPTION OF THE DRAWINGS

The features, aspects, and advantages of the present invention will become better understood with regard to the following description, appended claims, and accompanying drawings where

DETAILED DESCRIPTION

Figure 6:
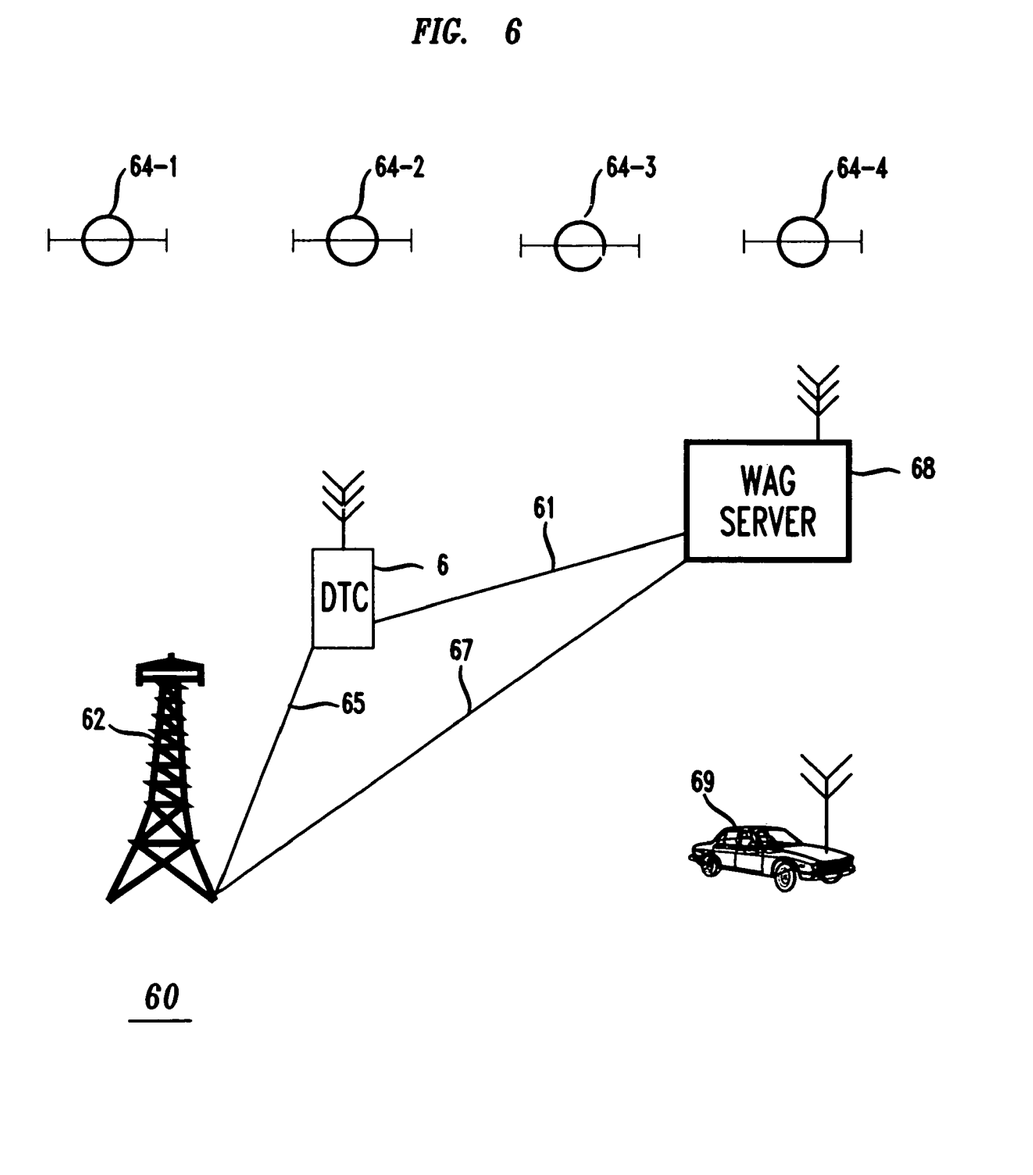
FIG. 6 depicts a wireless assisted GPS (WAG) system in accordance with the present invention.

FIG. 6 depicts a wireless communications or wireless assisted GPS (WAG) system 60 in accordance with the present invention. WAG 60 comprises at least one base station 62, a dedicated timing calibration (DTC) unit 66, a WAG server 68 and at least one WAG client 69. Base station 62 has a known location and provides communication services to WAG clients located within an associated geographical area or cell. Base station 62 is connected via a wired or wireless interface 65 and 67 to DTC unit 66 and WAG server 68. DTC unit 66 is a device for performing time calibration and may be connected to WAG server 68 via a wired or wireless interface 61. DTC unit 66 includes an oscillator and a GPS receiver having an antenna positioned with a clear view of the sky for receiving GPS signals from GPS satellites 64-$k$. WAG server 68 includes a GPS receiver having an antenna installed in a known stationary location with a clear view of the sky. WAG client 69 includes an oscillator, a GPS receiver and perhaps a mobile-telephone, and is typically in motion and/or in an unknown location with or without a clear view of the sky. Note that the term "mobile-telephone," for purposes of this application, shall be construed to include, but is not limited to, any communication device.

DTC unit 66 performs time calibrations between system timing and GPS timing. To describe how DTC unit 66 performs this time calibration function, an understanding of system timing and GPS timing is explained herein. System timing refers to the timing used by the wireless communications system to which base station 62 and WAG client 69 belong, whereas GPS timing refers to the timing used by GPS satellites 64. System timing is assumed to not be synchronized to GPS timing. It should be understood that the present invention is also applicable when system timing is synchronized to GPS timing, for example, where it can be used for fine tuning of the synchronization among multiple base stations.

Figure 7:
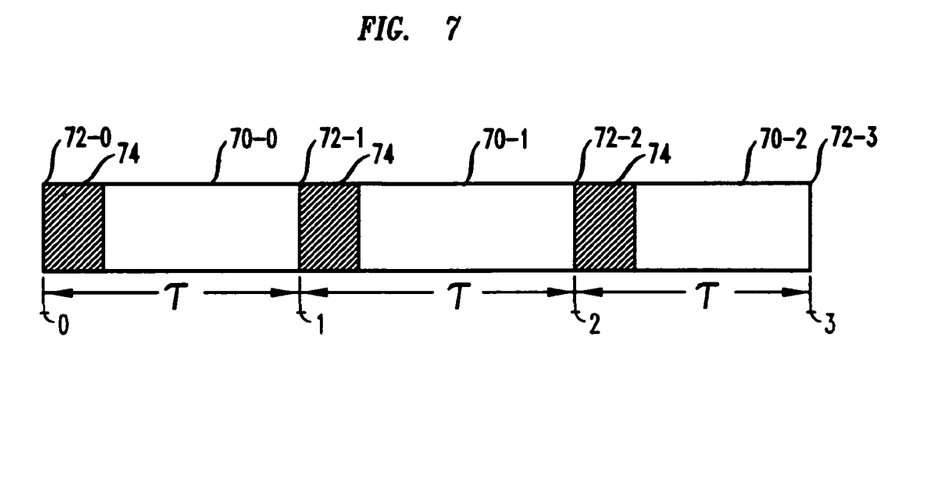
FIG. 7 depicts a series of frames over which data is transmitted.

System timing is used to synchronized base station 62 with other base stations belonging to a same wireless communications system, and to WAG client 24 or other mobile-stations belonging to the same wireless communications system. Base station 62 transmits data over a plurality of frames to WAG client 24, wherein each frame spans a known time interval and transmission of each frame is synchronized according to system timing. FIG. 7 depicts a series of frames 70-$n$ over which data is transmitted. Each frame 70-$n$ begins and ends transmission at times $t_n$ and $t_{n+1}$ wherein the time duration between times $t_n$ and $t_{n+1}$ is T. Frames 70-$n$ are defined by frame boundaries 72-$n$ and 72-$n$+1. Each frame 70-$n$ includes synchronization bits 74 for indicating frame boundaries 72-$n$ and/or 72-$n$+1. Note that synchronization bits 74 are shown in FIG. 7 as being at the beginning of a frame. It should be understood that synchronization bits 74 may be inserted anywhere within a frame 70-$n$ so long as synchronization bits 74 indicate the location of frame boundaries 72-$n$ and/or 72-$n$+1.

Figure 8:
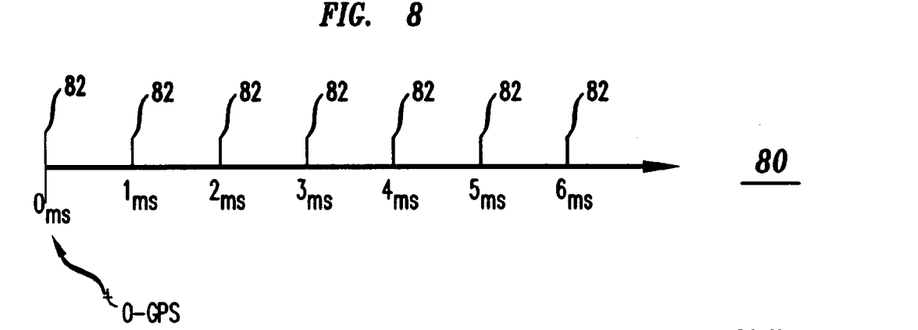
FIG. 8 depicts a GPS pulse train derived using a GPS signal.

GPS satellites 64-$k$ are synchronized to each other using GPS timing. GPS timing is embedded into GPS signals and subsequently transmitted to DTC unit 66, WAG server 68, WAG client 69 and any other device equipped with a GPS receiver. Upon receiving a GPS signal, DTC unit 66 derives a GPS time $t_{GPS\text{-}derived}$, and uses its oscillator to generate a GPS pulse train representing GPS timing, wherein the GPS pulse train is synchronized to the GPS time $t_{GPS\text{-}derived}$. DTC unit 66 will periodically derive other GPS times $t_{GPS\text{-}derived}'$ to discipline or correct errors in the GPS pulse train due to drifts in its oscillator. FIG. 8 illustrates a GPS pulse train 80 derived using a GPS signal and its oscillator. GPS pulse train 80 includes a series of pulses 82, wherein pulses 82 are spaced, for example, a millisecond apart.

Figure 9:
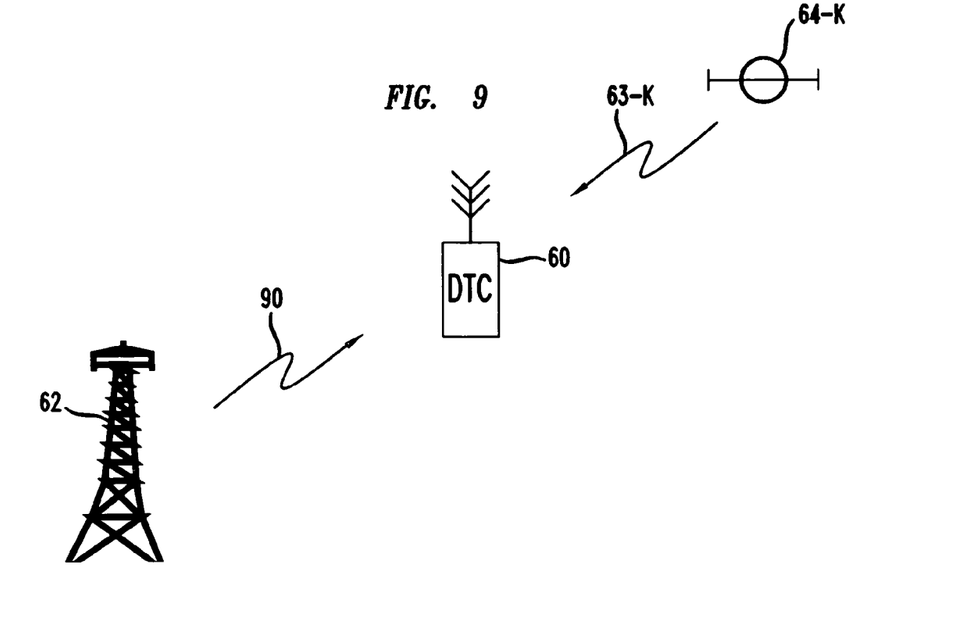
FIG. 9 depicts a base station signal and a GPS signal being transmitted to a dedicated timing calibration (DTC) unit over a wireless interface.

Time calibration is performed by DTC unit 66 using a base station signal and a GPS signal 63-$k$. Generally, the base station signal can be any signal transmitted by base station 62 over one or more frames 70. In one embodiment, the base station signal includes a request for DTC unit 66 (or other device equipped with a GPS receiver) to perform timing calibration. FIG. 9 depicts base station signal 90 and GPS signal 63-$k$ being transmitted to DTC unit 66 over a wireless interface.

Figure 10:
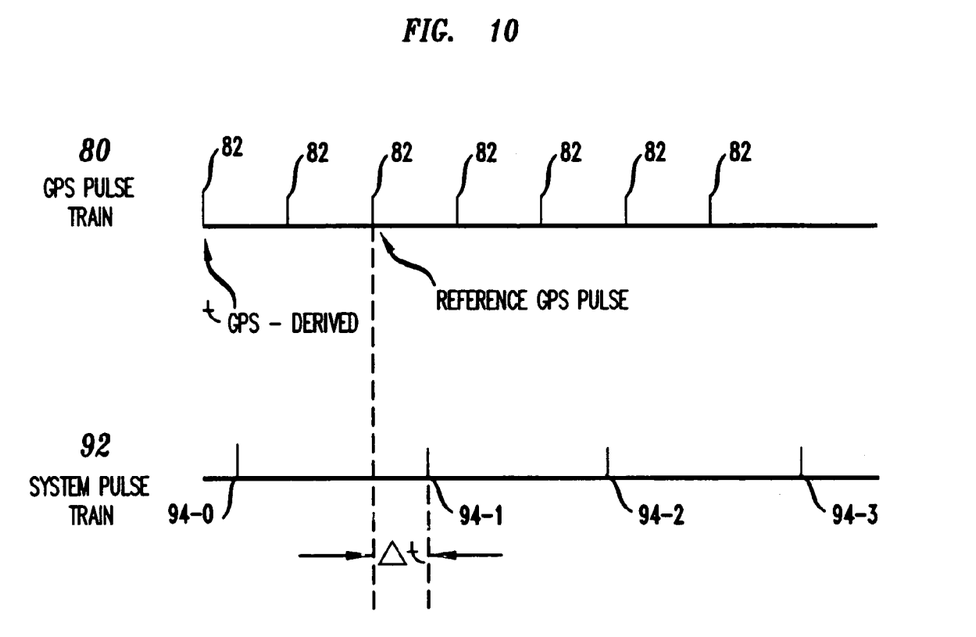
FIG. 10 depicts how time calibration is performed by DTC unit

FIG. 10 depicts how time calibration is performed by DTC unit 66. Upon receiving base station signal 90, DTC unit 66 determines when one or more frame boundaries 72-$n$ were received using synchronization bits 74 and generates a system pulse train 92 comprising of pulses 94-$n$, wherein pulses 94-$n$ corresponds to frame boundaries 72-$n$ or another reference point in frames 70-$n$. Similarly, upon receiving GPS signal 63-$k$, DTC unit 66 derives a GPS time $t_{GPS\text{-}derived}$ and generates GPS pulse train 80 using the derived GPS time $t_{GPS\text{-}derived}$ and its oscillator. Based on GPS pulse train 80 and system pulse train 92, DTC unit 66 determines a calibration time $\Delta t$ using its oscillator, which is the time difference between a reference GPS pulse (or time) 82 and a reference system pulse 94-$n$, wherein the DTC's oscillator preferably provides timing information at an accuracy of 0.05 parts per million or better. In one embodiment, the reference GPS pulse (or time) 82 is predetermined and known to DTC unit 66 and WAG client 69. For example, reference GPS pulse 82 corresponds to every $100^{th}$ pulse or millisecond from a reference GPS time Upon determining the calibration time $\Delta t$, DTC unit 66 subsequently transmits the calibration time $\Delta t$ and a reference frame identifier to base station 62, wherein the reference frame identifier specifies a frame boundary 72-$n$ (or frame 70-$n$) corresponding to the reference system pulse 94-$n$.

Note that in another embodiment, base station signal 90 is transmitted to DTC unit 66 over a wired interface. In yet another embodiment, DTC unit 66 is synchronized to system timing and has a prior knowledge of when frame boundaries 72 are transmitted, thus no base station signal 90 is transmitted to DTC unit 66.

Generating GPS pulse train 80 can be facilitated if GPS signal 63-$k$ can be acquired or detected faster by DTC unit 66. In one embodiment, base station signal 90 includes a request for timing calibration and information indicating GPS satellites 64-$k$ which are in view of base station 62 and/or DTC unit 66 and associated Doppler frequencies $f_k(r)$. In another embodiment, base station signal 90 includes the request for timing calibration and aiding information (such as that provided by WAG server 68 to WAG client 69 via base station 62) with a maximum holding time $\Delta T$ for indicating when such aiding information expires.

It should be noted that the above description for FIG. 10 assumes that DTC unit 66 is co-located with base station 62 and, thus, propagation delay for base station signal 90 to DTC unit 66 is negligible. It should be understood that the present invention is also applicable if the propagation delay between base station 62 and DTC unit 66 is not negligible. Persons of ordinary skill in the art should be able to perform time calibration under such circumstances.

Figure 11:
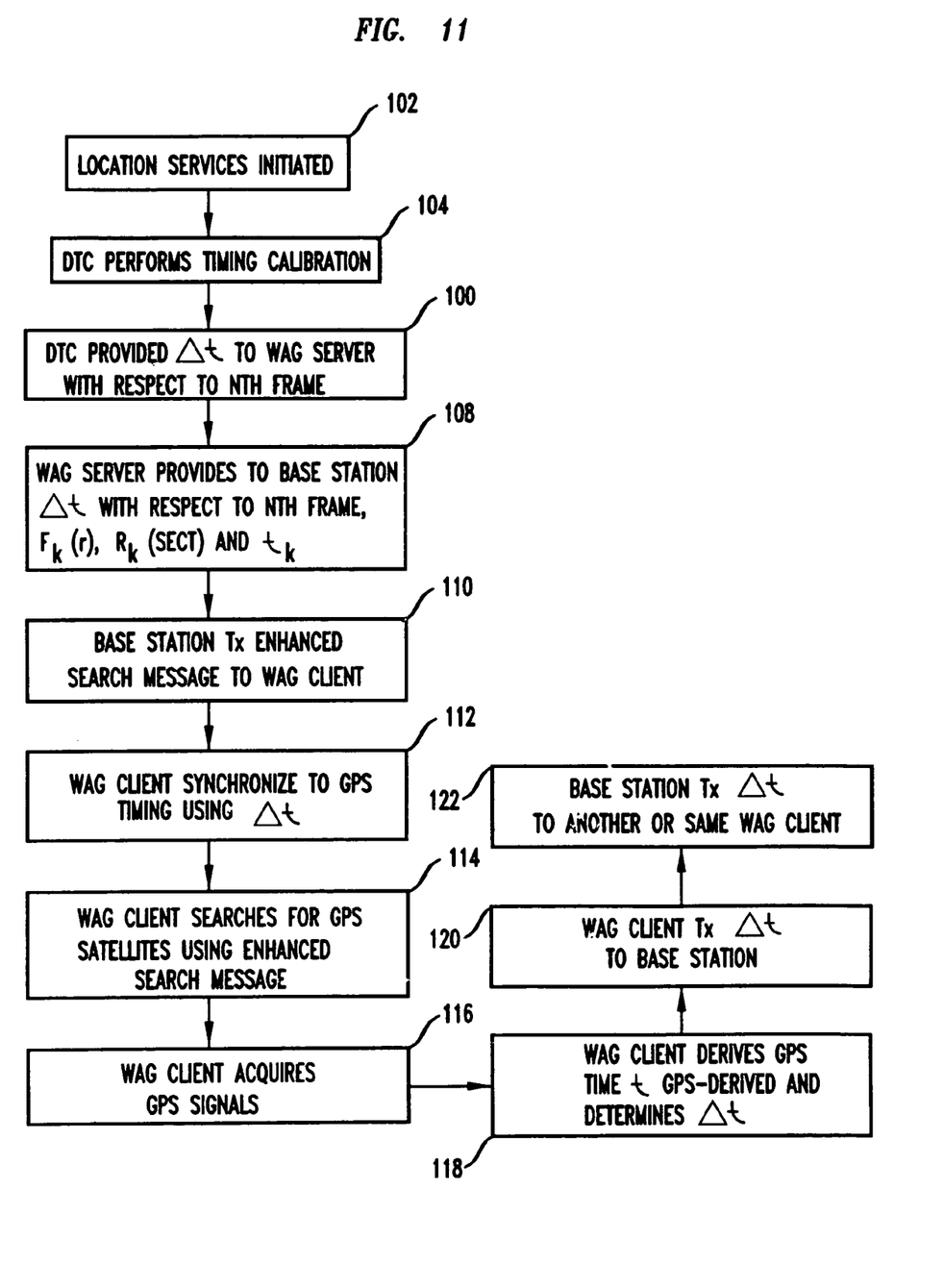
FIG. 11 depicts a flowchart illustrating one possible geographical location process using the WAG system of FIG. 6.

FIG. 11 is a flowchart 100 illustrating one possible geographical location process using WAG system 60 in accordance with the present invention. In step 102, location service is initiated and timing calibration is requested of DTC unit 66. In step 104, DTC unit 66 performs timing calibration, i.e., determine calibration time $\Delta t$, for a particular base station 62. In step 106, DTC unit 66 provides WAG server 68 via base station 62 with the calibration time $\Delta t$ with respect to the nth frame boundary. In step 108, WAG server 68 provides the following information to base station 62 for each satellite detected by WAG server 68: the calibration time $\Delta t$ with respect to the nth frame boundary, an estimated frequency $f_k(r)$ at a reference point within a sector in which WAG client 69 is currently located; a code phase search range $R_k(sect)$ which includes all possible code phases for GPS signal 63-$k$ arriving anywhere within the sector or an area smaller than the size of the sector where WAG client 69 is currently located; and a GPS reference time $t_k$ indicating a time duration or search window wherein the estimated frequency $f_k(r)$ and code phase search range $R_k(sect)$ are valid.

Figure 12:
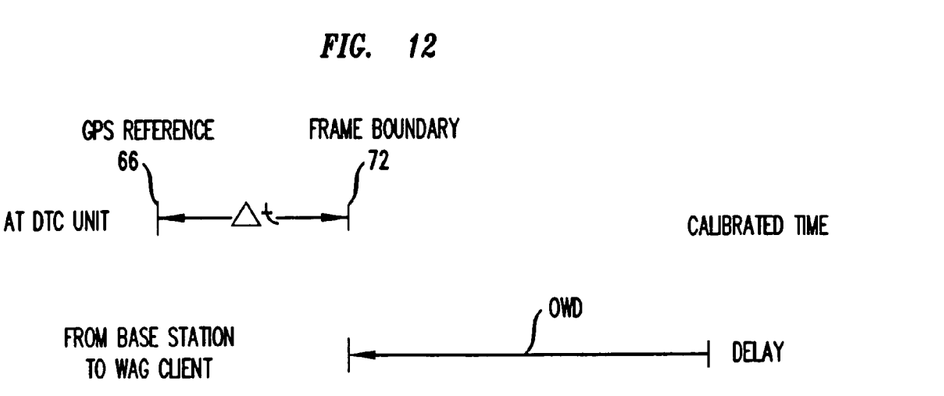
FIG. 12 depicts a relationship between a calibration time $\Delta t$ and one way propagation delay.

In step 110, base station 62 transmits an enhanced search message to WAG client 69, wherein the enhance search message is transmitted over a series of frames 70. The enhanced search message includes the estimated frequencies $f_k(r)$, the code phase search ranges $R_k(sect)$, the GPS reference times $t_k$, the calibration time $\Delta t$ and delay information. Delay information includes at least delays undergone in the transmission of the enhanced search message but not in the transmission of the base station signal from creation of the enhanced search message and/or base station signal in base station channel elements to reception of such signals at WAG client 69 and/or DTC unit 66, respectively. Typically, delay information includes one way (or roundtrip) propagation delays corresponding to delays in the transmission of signals from the base station antenna points to WAG client 69. Propagation delays can be determined in well known fashion. See FIG. 12, which depicts a relationship 95 between the calibration time $\Delta t$ and one way propagation delay OWD.

In step 112, WAG client 69 receives the enhanced search message, time stamps when the enhance search message was received using the synchronization bits and its internal clock, and synchronizes its internal clock using the calibration time $\Delta t$ and delay information included in the enhanced search message. Specifically, to synchronize its internal clock to GPS timing, WAG client 69 accounts for one way propagation delay between base station 62 and WAG client 69 by first subtracting the one way propagation delay OWD from the time at which the enhanced search message was received by WAG client 69 to produce a common frame boundary reference time with DTC unit 66. The common frame boundary reference time referring to a time reference in which non-common delays between transmission of a signal from base station 62 to DTC unit 66 and from base station 62 to WAG client 69 are taken into account. Subsequently, the calibration time $\Delta t$ is subtracted (or added) from the common frame boundary reference time to get GPS timing.

Note that step 112 assumes that DTC unit 66 has a wireless connection with base station 62 and is co-located with base station 62 such that the propagation delay is approximately zero or nil. Accordingly, signals transmitted from base station 62 to DTC unit 66 and WAG client 69 will undergo a same transmission delay between base station channel elements to base station antenna points. But if the connection between DTC unit 66 and base station is a wired interface, transmission delays would need be taken into account when performing time calibration since transmission delays between base station channel elements to DTC unit 66 may not be different than transmission delays between base station channel elements to base station antenna points (and/or WAG client 69). Specifically, transmission delay between base station channel elements and DTC unit 66 need be accounted for, and transmission delay between base station channel elements and antenna points need to be accounted for. Additionally, delay information would also need to include transmission delay information corresponding to delays in the transmission from base station channel elements to base station antenna points.

In step 114, WAG client 69 begins to search for the GPS signals indicated in the enhanced search message using the derived GPS timing. For example, DTC unit 66 searches for GPS satellite 63-$k$ by searching, within a search window indicated by GPS time $t_k$, for the associated PRN code PN-k using estimated frequency $f_k(r)$ and the code phase search range $R_k(sect)$.

In step 116, WAG client 69 detects and processes the detected GPS signals 63-$k$. In step 118, WAG client derives a GPS time $t_{GPS-derived'}$ upon processing the detected GPS signals and compares the GPS time $t_{GPS-derived'}$ to frame boundaries in signals transmitted by base station 62 to determine a second calibration time $\Delta t'$, wherein the calibration time $\Delta t'$ may or may not take into account one way propagation delays between WAG client 69 and base station 62. In step 120, the second calibration time $\Delta t'$ is transmitted back to base station 62. In step 122, if another request for time calibration is requested (for another or same WAG client 69), the second calibration time $\Delta t'$ may be used. Subsequently, another calibration time $\Delta t''$ is determined by the WAG client receiving the second calibration time and transmitted back to base station 62, and so on.

The present invention is described herein with reference to certain embodiments. It should be understood that other embodiments are possible and that the present invention should not be limited to the embodiments described herein.

For example, the present invention can be used to predict timing offsets among base stations in WCDMA systems to improve handoff performance. Currently, system timing at different base stations in WCDMA can be off by ±500 μs. This implies that when a mobile-station is handed off from one base station to another, the search window at the mobile-station should be as large as ±500 μs in order to acquire signals from the second base station (assuming that the distance from the first base station to the mobile-station and the from the second base station to the mobile-station is the same). By using the timing calibration Δt', the WCDMA system will have offset information regarding difference in system timing from base station to base station. The parameters that define the search window at the mobile-station can thus be enhanced to narrow the search window from signals transmitted by the second base station. Accordingly, the transient time of handoff can be reduced, and system performance improved.

In another example, the present invention can e used to enable a network based geographical location solution in a non-synchronized network to cover legacy mobile-stations (i.e., non-GPS equipped mobile-stations). The system timing is used to record time differences of arrival (TDOA) either at the mobile-station through down link or at multiple base stations through uplink signals. The system timing at multiple base stations are calibrated with the GPS timing.

We claim:

1. A method of time calibration comprising the steps of:
   determining a calibration time using system timing information and embedded satellite timing information;
   transmitting to a base station the calibration time and a reference frame identifier, wherein the reference frame identifier specifies a frame boundary of a reference system pulse corresponding to the system timing information used in the determination of the calibration time; and
   either receiving aiding information associated with at least one satellite signal and holding information for indicating when the aiding information expires; or transmitting a time for indicating a time duration wherein an estimated frequency or code phase search range is valid.

2. A method of time calibration comprising the steps of:
   receiving at a receiver a message at a base station having a calibration time and a reference frame identifier, wherein the message is received over one or more frames, the reference frame identifier specifying a frame boundary of a reference system pulse, the calibration time being determined using satellite timing information and the reference system pulse; and
   synchronizing the receiver to satellite timing using the calibration time, the reference frame identifier and a reference point in a frame specified by the reference frame identifier; and
   determining a second calibration time at the receiver using a detected satellite signal; and
   transmitting the second calibration time.

3. The method of claim 1 comprising the additional step of:
   receiving a request to perform timing calibration prior to the step of determining the calibration time.

4. The method of claim 1, wherein the step of determining the calibration time comprises the steps of:
   detecting at least one satellite signal; and
   determining the embedded satellite timing using the detected at least one satellite signal.

5. The method of claim 4 comprising the additional step of:
   receiving Doppler frequency information associated with the at least one satellite signal being detected prior to the step of detecting the at least one satellite signal.

6. The method of claim 1 comprising the additional step of:
   transmitting an estimated frequency or a code phase search range.

7. The method of claim 2, wherein the step of receiving at the receiver the message having the calibration time and the reference frame identifier comprises the step of:
   time stamping the message to indicate a time at which the message was received by the receiver.

8. The method of claim 2, wherein the second calibration time is based on a one way propagation delay between the receiver and a transmitter from which the message having the calibration time and the reference frame identifier was transmitted.

* * * * *